United States Patent
Davenport et al.

(10) Patent No.: US 7,815,978 B2
(45) Date of Patent: *Oct. 19, 2010

(54) METHOD FOR CONTROLLING A FUNCTIONAL PROPERTY OF AN INDUSTRIAL FABRIC

(75) Inventors: Francis L. Davenport, Ballston Lake, NY (US); Charles E. Kramer, Walpole, MA (US); Joseph G. O'Connor, Hopedale, MA (US); Maurice Paquin, Plainville, MA (US)

(73) Assignee: Albany International Corp., Albany, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/893,209

(22) Filed: Aug. 15, 2007

(65) Prior Publication Data

US 2007/0286951 A1    Dec. 13, 2007

Related U.S. Application Data

(62) Division of application No. 10/334,511, filed on Dec. 31, 2002.

(51) Int. Cl.
*B05D 3/02* (2006.01)
*C08F 2/48* (2006.01)

(52) U.S. Cl. .......... 427/508; 427/372.2; 427/385.5; 427/398.1

(58) Field of Classification Search ......... 427/508, 427/372.2, 385.5, 398.1
See application file for complete search history.

(56) References Cited

U.S. PATENT DOCUMENTS

| | | | |
|---|---|---|---|
| 3,042,568 A | 7/1962 | Ludowici et al. | 156/137 |
| 3,149,003 A | 9/1964 | Christie et al. | |
| 3,175,792 A | 3/1965 | Smallian | 245/8 |
| 3,350,260 A | 10/1967 | Johnson | 162/116 |
| 3,501,366 A | 3/1970 | Bramley et al. | |
| 3,549,742 A | 12/1970 | Benz | |
| 3,613,258 A | 10/1971 | Jamieson | 34/95 |

(Continued)

FOREIGN PATENT DOCUMENTS

DE    196 51 557    6/1998

(Continued)

OTHER PUBLICATIONS

S. Ashley, Rapid Prototyping Systems, *Mechanical Engineering*, Apr. 1991, pp. 34-43.

*Primary Examiner*—Elena T Lightfoot
(74) *Attorney, Agent, or Firm*—Frommer Lawrence & Haug LLP; Ronald R. Santucci

(57) ABSTRACT

A method for manufacturing a papermaker's or industrial fabric requires the application of a polymeric resin material onto preselected locations on a base substrate using an array which deposits the polymeric resin material in droplets having an average diameter of 10μ (10 microns) or more. The preselected locations, for example, may be knuckles formed by the interweaving of the yarns making up the fabric or interstices between the yarns. The purpose of such precise application of the resin is to control functional properties of the fabric, such as permeability and abrasion resistance. The polymeric resin material is set by means appropriate to its composition, and, optionally, may be abraded to provide the polymeric resin material above the surface plane of the base substrate with a uniform thickness.

20 Claims, 4 Drawing Sheets

U.S. PATENT DOCUMENTS

| | | | |
|---|---|---|---|
| 3,673,023 A | 6/1972 | Ross | 156/137 |
| 3,720,578 A | 3/1973 | Heling et al. | |
| 3,994,662 A | 11/1976 | Bramley | |
| 4,109,543 A | 8/1978 | Foti | 74/231 |
| 4,111,634 A | 9/1978 | Limbach et al. | |
| 4,187,618 A | 2/1980 | Diehl | 34/243 |
| 4,191,609 A | 3/1980 | Trokhan | 162/113 |
| 4,239,065 A | 12/1980 | Trokhan | 139/383 |
| 4,251,928 A | 2/1981 | Rotar et al. | 34/116 |
| 4,300,982 A | 11/1981 | Romanski | 162/358 |
| 4,312,009 A | 1/1982 | Lange | 346/140 |
| 4,382,987 A | 5/1983 | Smart | 428/212 |
| 4,383,495 A | 5/1983 | Plichta et al. | 118/406 |
| 4,427,734 A | 1/1984 | Johnson | 428/234 |
| 4,482,430 A | 11/1984 | Majaniemi | 162/358 |
| 4,514,345 A | 4/1985 | Johnson et al. | 264/22 |
| 4,528,239 A | 7/1985 | Trokhan | 428/247 |
| 4,529,480 A | 7/1985 | Trokhan | 162/109 |
| 4,567,077 A | 1/1986 | Gauthier | 428/114 |
| 4,571,798 A | 2/1986 | Adams | |
| 4,637,859 A | 1/1987 | Trokhan | 162/109 |
| 4,752,519 A | 6/1988 | Boyer et al. | |
| 4,917,937 A | 4/1990 | Leppanen et al. | |
| 4,981,745 A | 1/1991 | Lefkowitz | 428/147 |
| 5,066,532 A | 11/1991 | Gaisser | 428/137 |
| 5,084,326 A | 1/1992 | Vohringer | |
| 5,121,329 A | 6/1992 | Crump | |
| 5,136,515 A | 8/1992 | Helinski | 364/468 |
| 5,238,537 A | 8/1993 | Dutt | 162/358.4 |
| 5,240,531 A | 8/1993 | Toda et al. | 156/137 |
| 5,277,761 A | 1/1994 | Van Phan et al. | 162/109 |
| 5,292,438 A | 3/1994 | Lee | |
| 5,298,124 A | 3/1994 | Eklund et al. | 162/306 |
| 5,360,656 A | 11/1994 | Rexfelt et al. | 428/247 |
| 5,397,438 A | 3/1995 | Nyberg et al. | 162/207 |
| 5,422,166 A | 6/1995 | Fleischer | |
| 5,462,642 A | 10/1995 | Kajander | 162/116 |
| 5,506,607 A | 4/1996 | Sanders, Jr. et al. | 347/1 |
| 5,515,779 A | 5/1996 | Danby | |
| 5,518,680 A | 5/1996 | Cima et al. | |
| 5,556,509 A | 9/1996 | Trokhan et al. | 162/111 |
| 5,672,248 A | 9/1997 | Wendt et al. | 162/109 |
| 5,679,222 A | 10/1997 | Rasch et al. | 162/358.1 |
| 5,713,399 A | 2/1998 | Collette et al. | 139/383 |
| 5,714,041 A | 2/1998 | Ayers et al. | 162/111 |
| 5,731,059 A | 3/1998 | Smith et al. | 428/192 |
| 5,733,608 A | 3/1998 | Kessel et al. | 427/547 |
| 5,739,828 A * | 4/1998 | Moriyama et al. | 347/9 |
| 5,740,051 A | 4/1998 | Sanders, Jr. et al. | 364/468.26 |
| 5,746,887 A | 5/1998 | Wendt et al. | 162/109 |
| 5,787,602 A | 8/1998 | Hsu et al. | 34/116 |
| 5,804,036 A | 9/1998 | Phan et al. | |
| 5,817,374 A | 10/1998 | Detig et al. | 427/466 |
| 5,817,377 A | 10/1998 | Trokhan et al. | |
| 5,829,488 A | 11/1998 | Fagerholm et al. | 139/383 |
| 5,849,395 A | 12/1998 | Valentine et al. | |
| 5,936,861 A | 8/1999 | Jang et al. | |
| 6,080,691 A | 6/2000 | Lindsay et al. | 442/381 |
| 6,099,781 A | 8/2000 | Ampulski | |
| 6,120,642 A | 9/2000 | Lindsay et al. | 162/109 |
| 6,136,151 A | 10/2000 | Davenport et al. | 162/306 |
| 6,136,157 A | 10/2000 | Lindeberg et al. | 204/157.6 |
| 6,193,361 B1 * | 2/2001 | Wen | 347/84 |
| 6,193,847 B1 | 2/2001 | Trokhan | |
| 6,251,331 B1 | 6/2001 | Ampulski et al. | |
| 6,340,413 B1 | 1/2002 | Nilsson et al. | 162/361 |
| 6,350,336 B1 | 2/2002 | Paquin | 156/93 |
| 6,358,030 B1 | 3/2002 | Ampulski | |
| 6,358,594 B1 | 3/2002 | Ampulski | |
| 6,398,910 B1 | 6/2002 | Burazin et al. | |
| 6,419,795 B1 | 7/2002 | Dutt | |
| 6,953,244 B2 * | 10/2005 | Chen et al. | 347/95 |
| 7,005,043 B2 * | 2/2006 | Toney et al. | 162/361 |
| 7,005,044 B2 * | 2/2006 | Kramer et al. | 162/362 |
| 7,008,513 B2 * | 3/2006 | Davenport et al. | 162/361 |
| 7,014,735 B2 * | 3/2006 | Kramer et al. | 162/362 |
| 7,022,208 B2 * | 4/2006 | Davenport et al. | 162/358.2 |
| 7,166,196 B1 * | 1/2007 | Kramer et al. | 162/358.4 |
| 7,169,265 B1 * | 1/2007 | Kramer et al. | 162/358.4 |
| 7,297,234 B2 * | 11/2007 | Davenport et al. | 162/358.2 |
| 2001/0035598 A1 | 11/2001 | Ampulski | |
| 2002/0107495 A1 | 8/2002 | Chen et al. | |

FOREIGN PATENT DOCUMENTS

| | | |
|---|---|---|
| EP | 0 487 477 | 5/1992 |
| EP | 0 568 509 | 11/1993 |
| EP | 0 613 729 | 9/1994 |
| EP | 0 677 612 A2 | 10/1995 |
| GB | 1 053 282 | 5/1963 |
| WO | WO 92/00415 | 1/1992 |
| WO | WO 93/00474 | 1/1993 |
| WO | WO 96/35018 | 11/1996 |
| WO | WO 97/14846 | 4/1997 |
| WO | WO 99/35332 | 7/1999 |
| WO | WO 00/09308 | 2/2000 |
| WO | WO 02/088464 A1 | 11/2002 |
| WO | WO 2004/045834 A1 | 6/2004 |

* cited by examiner

METHOD FOR CONTROLLING A FUNCTIONAL PROPERTY OF AN INDUSTRIAL FABRIC

CROSS-REFERENCE TO RELATED APPLICATIONS

This application is a division of U.S. patent application Ser. No. 10/334,511 filed Dec. 31, 2002 entitled "Method for Controlling a Functional Property of an Industrial Fabric and Industrial Fabric", the disclosure of which is hereby incorporated by reference.

BACKGROUND OF THE INVENTION

1. Field of the Invention

The present invention relates, in part, to the papermaking arts, and specifically to the fabrics, commonly referred to as paper machine clothing, on which paper is manufactured on paper machines. The present invention also relates to the manufacture of nonwoven articles and fabrics by processes such as hydroentanglement, and specifically to the so-called industrial fabrics on which such articles and fabrics are manufactured. More specifically still, the present invention concerns the provision of such fabrics with desired functional properties through the controlled deposition thereon of polymeric resin materials.

2. Description of the Prior Art

As is well known to those of ordinary skill in the art, the papermaking process begins with the deposition of a fibrous slurry, that is, an aqueous dispersion of cellulosic fibers, onto a moving forming fabric in the forming section of a paper machine. A large amount of water is drained from the slurry through the forming fabric during this process, leaving a fibrous web on its surface.

The newly formed web proceeds from the forming section to a press section, which includes a series of press nips. The fibrous web passes through the press nips supported by a press fabric, or, as is often the case, between two press fabrics. In the press nips, the fibrous web is subjected to compressive forces which squeeze water therefrom, and which adhere its constituent fibers to one another to turn the fibrous web into a sheet. The water squeezed from the web is accepted by the press fabric or fabrics, and, ideally, does not return to the web.

The web, now a sheet, finally proceeds to a dryer section, which includes at least one series of rotatable dryer drums or cylinders, which are internally heated by steam. The sheet itself is directed in a serpentine path sequentially around each in the series of drums by a dryer fabric, which holds the web closely against the surfaces of at least some of the drums. The heated drums reduce the water content of the sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speed. That is to say, the fibrous slurry is continuously deposited onto the forming fabric in the forming section, while a newly manufactured paper sheet is continuously wound onto rolls after it exits from the dryer section at the downstream end of the paper machine.

The production of nonwoven products is also well known in the art. Such fabrics are produced directly from fibers without conventional spinning, weaving or knitting operations. Instead, they may be produced by spun-bonding or melt-blowing processes in which newly extruded fibers are laid down to form a web while still in a hot, tacky condition following extrusion, whereby they adhere to one another to yield an integral nonwoven web.

Nonwoven product may also be produced by air-laying or carding operations where the web of fibers is consolidated, subsequent to deposition, into a nonwoven product by needling or hydroentanglement. In the latter, high-pressure water jets are directed vertically down onto the web to entangle the fibers with each other. In needling, the entanglement is achieved mechanically through the use of a reciprocating bed of barbed needles which force fibers on the surface of the web further thereinto during the entry stroke of the needles.

Endless industrial fabrics play a key role in these processes. Generally, these fabrics are woven from plastic monofilament, although metal wire may be used instead of plastic monofilament when temperature conditions during a nonwovens manufacturing process make it impractical or impossible to use plastic monofilament. As is the case with paper machine clothing, such industrial fabrics also function in the manner of conveyors on which the webs are laid down and consolidated in a continuous fashion according to the methods described above.

In each of these situations, where a papermaker's or industrial fabric is used as an endless conveyor in a continuous production process, the inner surface of the endless fabric encounters stationary components of the machine on which it is being used and is susceptible to abrasive wear which results from such contact. To prolong the working life of the fabrics, an abrasion resistant layer of a polymeric resin material may be applied to the inner surface of the fabric. Traditionally, spraying and kiss-roll coating have been among the techniques used to apply such coatings. To their disadvantage, such techniques are imprecise and can adversely affect the permeabilities of the fabrics in a nonuniform and uncontrolled manner. As localized differences in the permeabilities can visibly affect the quality of the paper or nonwoven product produced on the industrial fabric, there has been a need for a method for applying an abrasion resistant layer of a polymeric resin material to the inner surface of an endless fabric without adversely affecting its permeability characteristics.

In a similar vein, there has also been a need to apply such a layer or coating to the outer surface of the endless fabric without adversely affecting its permeability in order, for example, to improve the handling or conveyance of the paper or nonwoven fabric being manufactured thereon. For example, U.S. Pat. No. 5,829,488 discloses a dryer fabric intended for use on a single-run dryer section on a paper machine. The dryer fabric is a woven structure having a so-called paper side which faces a paper sheet in the dryer section. At least some of the yarns of the dryer fabric on the paper side are hydrophilic to improve the adhesion between the dryer fabric and the paper sheet. The yarns may be made hydrophilic by coating the paper side with a hydrophilic polymeric resin material. It is difficult to do so by conventional methods, that is, by spraying or kiss-roll coating, without adversely affecting the permeability of the fabric.

Finally, there has also been a need for a method to apply a polymeric resin material to a papermaker's or industrial fabric in a controlled manner to adjust its permeability to a desired value either in selected regions or through the entire surface of the fabric. Such a method could be used, to remove localized departures from the uniform permeability desired for the fabric or to adjust the permeability of the fabric to some desired uniform value. For example, heretofore by changing the MD yarn count on the edges (tighter for lower permeability) verses a lower count in the center of a fabric for higher permeability was an effort to achieve a more uniform moisture profile in the cross machine direction. This approach suffered however drawbacks.

The present invention provides for these needs by providing a method in which polymeric resin material can be applied to the surface of a papermaker's or industrial fabric at a high level of control and precision so as not to effect its permeability, and achieve a desired effect or to affect it in desired manner such as to change surface contact area, and abrasion resistance with a minimal effect on permeability or, in contrast change, void volume or localized departures of permeability.

SUMMARY OF THE INVENTION

Accordingly, the present invention is a method for manufacturing a papermaker's or industrial fabric having a functional property, such as permeability or abrasion resistance, controlled through the precise application of a polymeric resin material onto or within its surface. The method comprises a first step of providing a base substrate for the fabric.

The polymeric resin material is deposited onto preselected locations on the base substrate by at least one piezojet in droplets having an average diameter of 10μ (10 microns) or more. The polymeric resin material is then set or fixed by appropriate means.

The preselected locations may, for example, may be knuckles formed on the surface of the fabric by the interweaving of its yarns, if it is abrasion resistance or sheet handling that is to be controlled. The preselected locations may be the interstices between the yarns, if permeability is the functional property to be controlled.

Subsequently, the coating of polymeric resin material may optionally be abraded to provide it with a uniform thickness over the surface plane of the base substrate to improve surface smoothness or increase contact area.

The present invention will now be described in more complete detail, with frequent reference being made to the figures identified below.

DETAILED DESCRIPTION OF THE PREFERRED EMBODIMENTS

Figure 1:
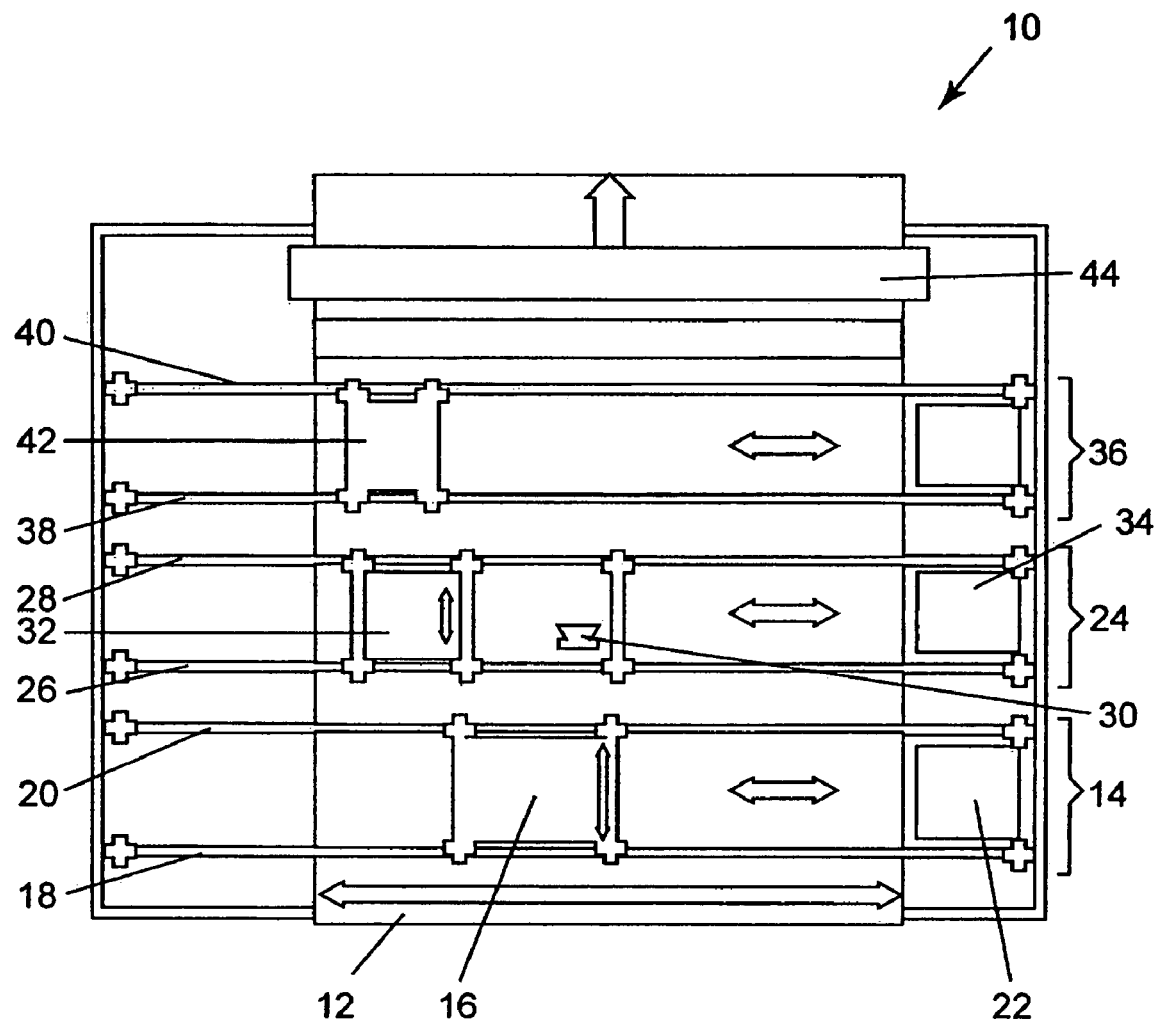
FIG. 1 is a schematic view of an apparatus used to manufacture papermaker's and industrial fabrics according to the method of the present invention.

The method for fabricating a papermaker's or industrial fabric in accordance with the present invention begins with the provision of a base substrate. Typically, the base substrate is a fabric woven from monofilament yarns. More broadly, however, the base substrate may be a woven, nonwoven, spiral-link or knitted fabric comprising yarns of any of the varieties used in the production of paper machine clothing or of the industrial fabrics used to manufacture nonwoven articles and products, such as monofilament, plied monofilament, multifilament and plied multifilament yarns. These yarns may be obtained by extrusion from any of the polymeric resin materials used for this purpose by those of ordinary skill in the art. Accordingly, resins from the families of polyamide, polyester, polyurethane, polyaramid, polyolefin and other resins may be used.

Alternatively, the base substrate may be composed of mesh fabrics, such as those shown in commonly assigned U.S. Pat. No. 4,427,734 to Johnson, the teachings of which are incorporated herein by reference. The base substrate may further be a spiral-link belt of the variety shown in many U.S. patents, such as U.S. Pat. No. 4,567,077 to Gauthier, the teachings of which are also incorporated herein by reference.

Moreover, the base substrate may be produced by spirally winding a strip of woven, nonwoven, knitted or mesh fabric in accordance with the methods shown in commonly assigned U.S. Pat. No. 5,360,656 to Rexfelt et al., the teachings of which are incorporated herein by reference. The base substrate may accordingly comprise a spirally wound strip, wherein each spiral turn is joined to the next by a continuous seam making the base substrate endless in a longitudinal direction.

The above should not be considered to be the only possible forms for the base substrate. Any of the varieties of base substrate used by those of ordinary skill in the paper machine clothing and related arts may alternatively be used.

Once the base substrate has been provided, one or more layers of staple fiber batt may optionally be attached to one or both of its two sides by methods well known to those of ordinary skill in the art. Perhaps the best known and most commonly used method is that of needling, wherein the individual staple fibers in the batt are driven into the base substrate by a plurality of reciprocating barbed needles. Alternatively, the individual staple fibers may be attached to the base substrate by hydroentangling, wherein fine high-pressure jets of water perform the same function as the above-mentioned reciprocating barbed needles. It will be recognized that, once staple fiber batt has been attached to the base substrate by either of these or other methods known by those of ordinary skill in the art, one would have a structure identical to that of a press fabric of the variety generally used to dewater a wet paper web in the press section of a paper machine.

In some cases, it may be necessary to apply an initial layer or additional batt to the structure after application of the resin. In such cases the patterned resin may lie below a layer of batt fibers. Also, the resin layer may reside in a laminate, perhaps between two base structures to prevent, for example, "nesting" or to achieve other desired results.

Once the base substrate, with or without the addition of staple fiber batt material on one or both of its two sides has been provided, it is mounted on the apparatus 10 shown schematically in FIG. 1. It should be understood that the base substrate may be either endless or seamable into endless form during installation on a paper machine. As such, the base substrate 12 shown in FIG. 1 should be understood to be a relatively short portion of the entire length of the base substrate 12. Where the base substrate 12 is endless, it would most practically be mounted about a pair of rolls, not illustrated in the figure but most familiar to those of ordinary skill in the paper machine clothing arts. In such a situation, apparatus 10 would be disposed on one of the two runs, most conveniently the top run, of the base substrate 12 between the two rolls. Whether endless or not, however, the base substrate 12 is preferably placed under an appropriate degree of tension during the process. Moreover, to prevent sagging, the base substrate 12 may be supported from below by a horizontal support member as it moves through apparatus 10.

Referring now more specifically to FIG. 1, where the base substrate 12 is indicated as moving in an upward direction through the apparatus 10 as the method of the present invention is being carried out, apparatus 10 comprises a sequence of several stations through which the base substrate 12 may pass incrementally as a fabric is being manufactured therefrom.

The stations are identified as follows:
1. optional polymer deposition station 14;
2. imaging/precise polymer deposition station 24;
3. optional setting station 36; and
4. optional grinding station 44.

In the first station, the optional polymer deposition station 14, a piezojet array 16 mounted on transverse rails 18,20 and translatable thereon in a direction transverse to that of the motion of the base substrate 12 through the apparatus 10, as well as therebetween in a direction parallel to that of the motion of the base substrate 12, may be used to deposit in repeated steps to build up the desired amount of a polymeric resin material onto or within the base substrate 12 while the base substrate 12 is at rest. Optional polymer deposition station 14 may be used to deposit the polymeric resin material more uniformly over the base substrate than could be accomplished using conventional techniques, such as spraying, if desired. It should be understood, however, that polymer deposition station 14 would apply the polymeric resin material indiscriminately to both the yarns of the base substrate 12 and to the spaces or interstices between the yarns. This may not be desired in all applications and, as such, the use of polymer deposition station 14 is optional in the present invention.

In addition the deposit of the material need not only be traversing the movement of the base substrate but can be parallel to such movement, spiral to such movement or in any other manner suitable for the purpose.

The piezojet array 16 comprises at least one but preferably a plurality of individual computer-controlled piezojets, each functioning as a pump whose active component is a piezoelectric element. As a practical matter, an array of up to 256 piezojets or more may be utilized, if the technology permits. The active component is a crystal or ceramic which is physically deformed by an applied electric signal. This deformation enables the crystal or ceramic to function as a pump, which physically ejects a drop of a liquid material each time an appropriate electric signal is received. As such, this method of using piezojets to supply drops of a desired material in response to computer-controlled electric signals is commonly referred to as a "drop-on-demand" method.

Referring again to FIG. 1, the piezojet array 16, starting from an edge of the base substrate 12, or, preferably, from a reference thread extending lengthwise therein, translates lengthwise and widthwise across the base substrate 12, while the base substrate 12 is at rest, deposits the polymeric resin material in the form of extremely small droplets having a nominal diameter of 10µ (10 microns) or more such as, and 50µ (50 microns) or 100µ (100 microns), onto the base substrate 12. The translation of the piezojet array 16 lengthwise and widthwise relative to the base substrate 12, and the deposition of droplets of the polymeric resin material from each piezojet in the array 16, are controlled in a controlled manner to control the geometry in three planes, length, width and depth or height (x, y, z dimension directions) of the pattern being formed by computer to apply repeatedly so as to build up the desired amount of material in the desired shape of the polymeric resin material per unit area of the base structure 12.

In the present invention, in which a piezojet array is used to deposit a polymeric resin material onto or within the surface of the base substrate 12, the choice of polymeric resin material is limited by the requirement that its viscosity be 100 cps (100 centipoise) or less at the time of delivery, that is, when the polymeric resin material is in the nozzle of a piezojet ready for deposition, so that the individual piezojets can provide the polymeric resin material at a constant drop delivery rate. A second requirement limiting the choice of polymeric resin material is that it must partially set during its fall, as a drop, from a piezojet to the base substrate 12, or after it lands on the base substrate 12, to prevent the polymeric resin material from flowing and to maintain control over the polymeric resin material to ensure that it remains in the form of a drop where it lands on the base substrate 12. Suitable polymeric resin materials which meet these criteria are:
1. Hot melts and moisture-cured hot melts;
2. Two-part reactive systems based on urethanes and epoxies;
3. Photopolymer compositions consisting of reactive acrylated monomers and acrylated oligomers derived from urethanes, polyesters, polyethers, and silicones; and
4. Aqueous-based latexes and dispersions and particle-filled formulations including acrylics and polyurethanes.

It should be understood that the polymeric resin material needs to be fixed on or within the base substrate 12 following its deposition thereon. The means by which the polymeric resin material is set or fixed depends on its own physical and/or chemical requirements. Photopolymers are cured with light, whereas hot-melt materials are set by cooling. Aqueous-based latexes and dispersions are dried and then cured with heat, and reactive systems are cured by heat. Accordingly, the polymeric resin materials may be set by curing, cooling, drying or any combination thereof.

The degree of precision of the jet in depositing the material will depend upon the dimensions and shape of the structure being formed. The type of jet used and the viscosity of the material being applied will also impact the precision of the jet selected.

The proper fixing of the polymeric resin material is required to control its penetration into and distribution within the base substrate 12, that is, to control and confine the material within the desired volume or on the surface of the base substrate 12. Such control is important below the surface plane of the base substrate 12 to prevent wicking and spreading. Such control may be exercised, for example, by maintaining the base substrate 12 at a temperature which will cause the polymeric resin material to set quickly upon contact. Control may also be exercised by using such materials having well-known or well-defined curing or reaction times on base substrates having a degree of openness such that the polymeric resin material will set before it has time to spread beyond the desired volume of the base substrate 12.

When the desired amount of polymeric resin material has been applied per unit area in a band between the transverse rails 18,20 across the base substrate 12, if any, the base substrate 12 is advanced lengthwise an amount equal to the width of the band, and the procedure described above is repeated to apply the polymeric resin material in a new band adjacent to that previously completed. In this repetitive manner, the entire base substrate 12 can be provided with any desired amount of polymeric resin material per unit area.

Alternatively, the piezojet array 16, again starting from an edge of the base substrate 12, or, preferably, from a reference thread extending lengthwise therein, is kept in a fixed position relative to the transverse rails 18,20, while the base substrate 12 moves beneath it, to apply any desired amount of the polymeric resin material per unit area in a lengthwise strip around the base substrate 12. Upon completion of the lengthwise strip, the piezojet array 16 is moved widthwise on transverse rails 18,20 an amount equal to the width of the lengthwise strip, and the procedure described above is repeated to apply the polymeric resin material in a new lengthwise strip adjacent to that previously completed. In this repetitive manner, the entire base substrate 12 can be provided with the desired amount of polymeric resin material per unit area, if desired.

Figure 3:
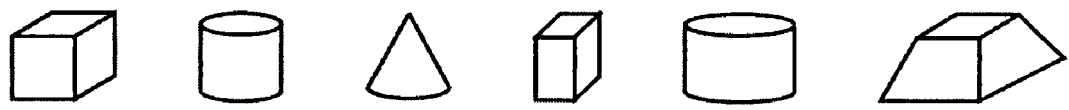
FIG. 3 is a perspective view of a variety of representative shapes of the deposited material.

One or more passes over the base substrate 12 may be made by piezojet array 16 to deposit the desired amount of material and to create a desired shape. In this regard, the deposits can take any number of shapes as illustrated generally in FIG. 3. The shapes can be square, round conical, rectangular, oval, trapezoidal etc. with a thicker base tapering upward. Depending upon the design chosen, the amount of material deposited can be layered in decreasing fashion as the jet repeatedly passes over the deposit area.

At one end of the transverse rails 18,20, a jet check station 22 is provided for testing the flow of polymeric resin material from each piezojet in the piezojet array 16. There, the piezojets can be purged and cleaned to restore operation automatically to any malfunctioning piezojet unit.

In the second station, the imaging/precise polymer deposition station 24, the only station not optional in the present invention, transverse rails 26,28 support a digital-imaging camera 30, which is translatable across the width of base substrate 12, and a piezojet array 32, which is translatable both across the width of the base substrate 12 and lengthwise relative thereto between transverse rails 26, 28, while the base substrate 12 is at rest.

Figure 4A:
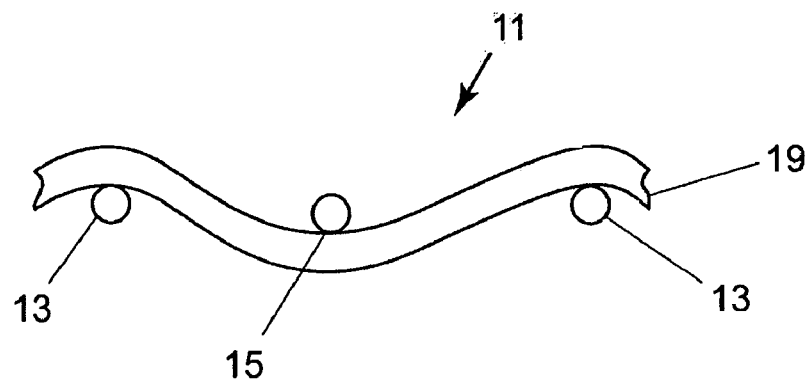
FIGS. 4A-C are side and top representative views of the application of resin between yarns.
Figure 4B:
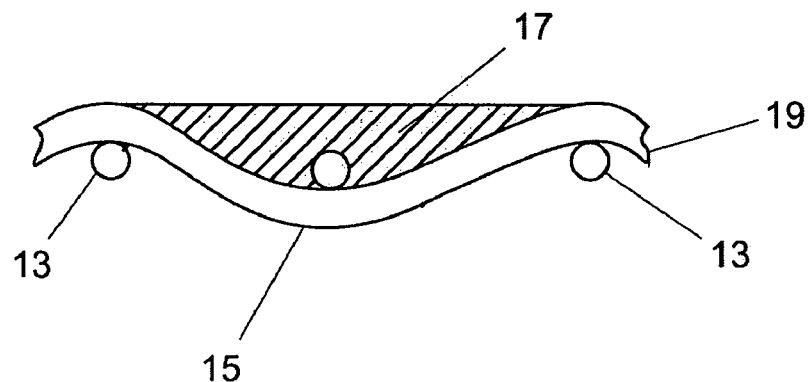
Figure 4C:
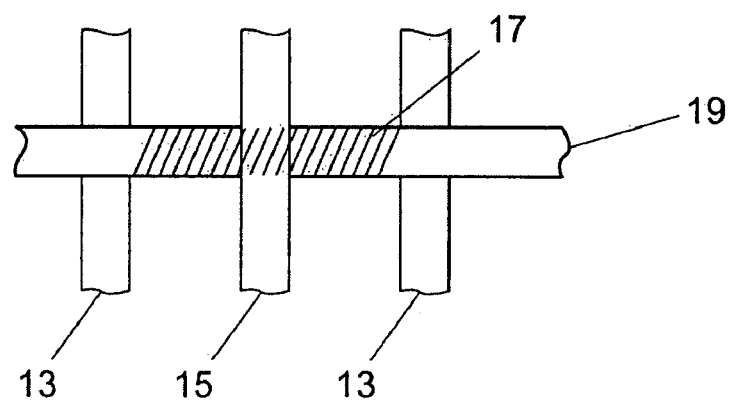

The digital-imaging camera 30 views the surface of the base substrate 12 to locate the yarns of the base substrate 12 and the spaces or interstices between the yarn. Comparisons between the actual surface and its desired appearance are made by a fast pattern recognizer (FPR) processor operating in conjunction with the digital imaging camera 30. The FPR processor signals the piezojet array 32 to deposit polymeric resin material onto the locations requiring it to match the desired appearance. For example, if it is desired that the interstices be blocked by polymeric resin material in some sequence to control the permeability of the fabric in a desired manner, such a result can be achieved by the imaging/precise polymer deposition station 24. Note as shown in FIGS. 4A-C the filling of the space 11 between yarns 13 and above yarn 15 can be provided through the controlled deposit of a resin material 17 on yarn 19 so as to provide surface uniformity and planarity.

Alternatively, if the polymeric resin material is to be deposited onto the yarns alone, rather than into the interstices between them, that can also be achieved by the imaging/precise polymer deposition station 24. As before, at one end of the transverse rails 26,28, a piezojet check station 34 is provided for testing the flow of material from each jet. There, each piezojet in the piezojet array 32 can be purged and cleaned to restore operation automatically to any malfunctioning piezojet unit.

In the third station, the optional setting station 36, transverse rails 38,40 support a setting device 42, which may be required to set the polymeric resin material being used. The setting device 42 may be a heat source, for example, an infrared, hot air, microwave or laser source cold air or an ultraviolet or visible-light source, the choice being governed by the requirements of the polymeric resin material being used.

Finally, the fourth and last station is the optional grinding station 44, where an appropriate abrasive is used to provide any polymeric resin material above the surface plane of the base substrate 12 with a uniform thickness. The optional grinding station 44 may comprise a roll having an abrasive surface, and another roll or backing surface on the other side of the base substrate 12 to ensure that the grinding will result in a uniform thickness.

Figure 2:
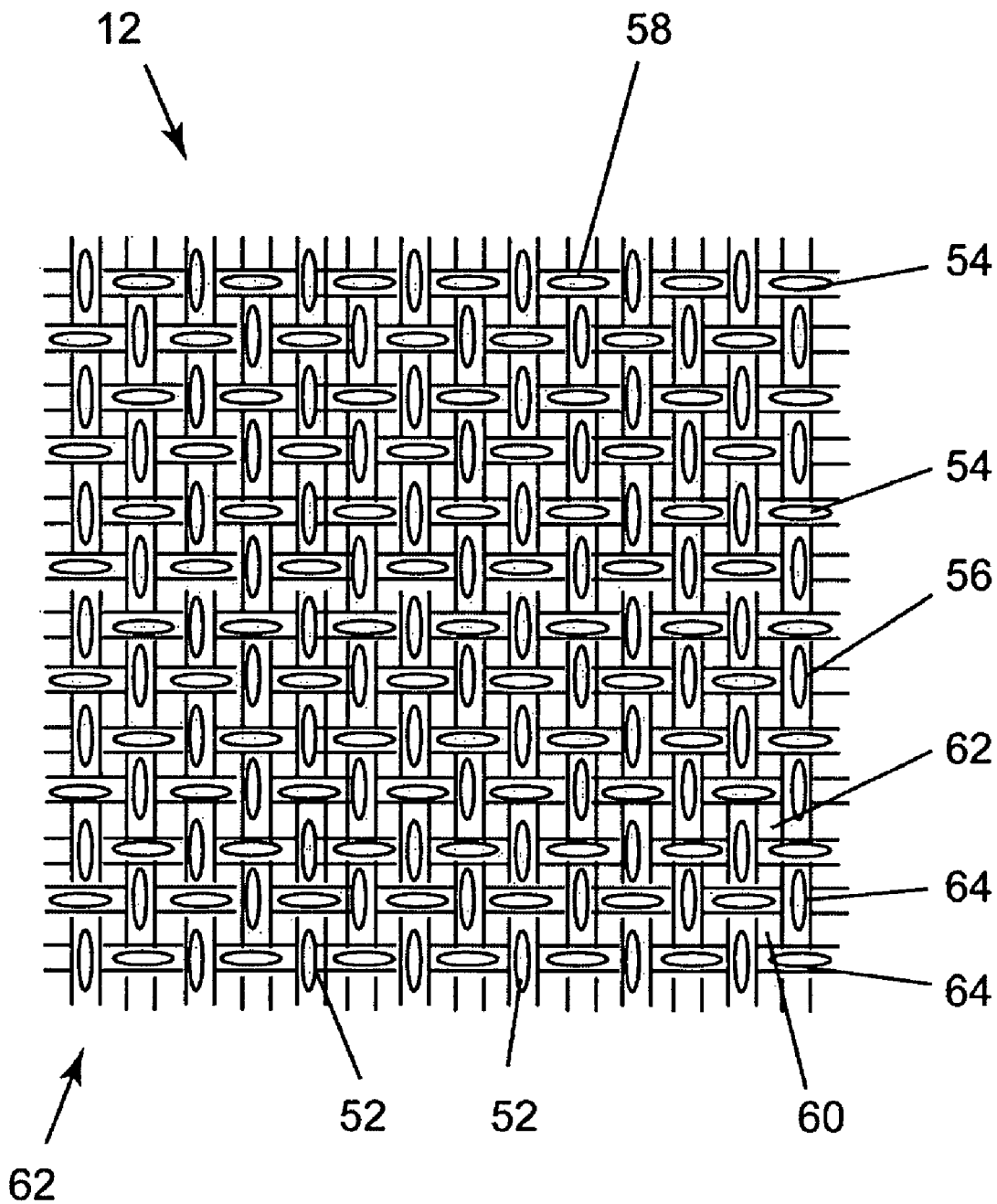
FIG. 2 is a plan view of a completed fabric as it would appear upon exit from the apparatus of FIG. 1.

As an example, reference is now made to FIG. 2, which is a plan view of a base substrate 12 having polymeric resin material deposited in precise locations on the surface thereof in accordance with the present invention. The base substrate 12 is woven from lengthwise yarns 52 and crosswise yarns 54 in a single-layer plain weave, although it should be understood that the inventors do not intend the practice of the present invention to be limited to such a weave. The lengthwise yarns 52 form knuckles 56 where they pass over crosswise yarns 54. Similarly, the crosswise yarns 54 form knuckles 58 where they pass over lengthwise yarns 52. A plurality of interstices 60 are formed between the lengthwise yarns 52 and crosswise yarns 54 by the interweaving thereof.

FIG. 2 is a plan view of a completed fabric as it would appear upon exit from optional setting station 36 and the optional grinding station 44 of apparatus 10. The fabric 62 has certain preselected interstices 60 blocked by polymeric resin material 64 deposited in precisely those locations by imaging/precise polymer deposition station 24 to control the permeability of the fabric 62 in a predetermined way. In addition, knuckles 56,58 have a coating 64 applied thereto. Coating 64 could either be for abrasion resistance, if the view given in FIG. 2 is of the back side of the fabric 62, or for improved sheet handling, if the view is of the paper side of the fabric 62. Coating 64 is precisely applied to the knuckles 56,58 by imaging/precise polymer deposition station 24.

Note the pattern can be random, a repeating random pattern on a base substrate or such patterns that are repeatable from belt to belt for quality control.

The surface is usually the contacting surface with the paper, tissue, towel or nonwoven products to be produced. It is envisioned that some fabrics/processes will require this resin to be primarily on the nonproduct contact surface. In an alternate embodiment of the present invention, the optional polymer deposition station 14, the imaging/repair station 24, and the optional setting station 36 may be adapted to produce a fabric from the base substrate 12 according to a spiral technique, rather than by indexing in the cross-machine direction as described above. In a spiral technique, the optional polymer deposition station 14, the imaging/precise polymer deposition station 24, and the optional setting station 36 start at one edge of the base substrate 12, for example, the left-hand edge in FIG. 1, and are gradually moved across the base substrate 12, as the base substrate 12 moves in the direction indicated in FIG. 1. The rates at which the stations 14,24,36 and the base substrate 12 are moved are set so that the polymeric resin material desired in the finished fabric is spiraled onto the base substrate 12 as desired in a continuous manner. In this alternative, the polymeric resin material deposited by the optional polymer deposition station 14 and imaging/precise polymer deposition station 24 may be partially set or fixed as each spiral passes beneath the optional setting device 42, and completely set when the entire base substrate 12 has been processed through the apparatus 10.

Alternatively, where the optional polymer deposition station 14, the imaging/precise polymer deposition station 24 and the optional setting station 36 may all be kept in fixed positions aligned with one another, while the base substrate 12 moves beneath them, so that the polymeric resin material desired for the finished fabric may be applied to a lengthwise strip around the base substrate 12. Upon completion of the lengthwise strip, the optional polymer deposition station 14, the imaging/precise polymer deposition station 24 and the optional setting station 36 are moved widthwise an amount equal to the width of the lengthwise strip, and the procedure is repeated for a new lengthwise strip adjacent to that previously completed. In this repetitive manner the entire base structure 12 can be completely processed as desired. Note some of the individual piezojets in the piezojet array may be used to deposit one polymeric resin material, while others may be used to deposit a different polymeric resin material, to produce for example; a surface having microregions of more than one type of polymeric resin material.

Furthermore, the entire apparatus can remain in a fixed position with the material processed. It should be noted that the material need not be a full width fabric but can be a strip of material such as that disclosed in U.S. Pat. No. 5,360,656 to Rexfelt, the disclosure of which is incorporated herein by reference, and subsequently formed into a full width fabric. The strip can be unwound and wound up on a set of rolls after fully processing. These rolls of fabric strips can be stored and can then be used to form an endless full width structure using, for example, the teachings of the immediately aforementioned patent.

Modifications to the above would be obvious to those of ordinary skill in the art, but would not bring the invention so modified beyond the scope of the appended claims. The resin applied can be in any pattern or combination of filling voids as well as on yarns. It can be continuous or discontinuous along the yarn length and provide for wear resistance. While piezojets are disclosed above as being used to deposit the functional polymeric resin material, in preselected locations on or within the base substrate, other means for depositing droplets thereof in the size range desired may be known to those of ordinary skill in the art or may be developed in the future, and such other means may be used in the practice of the present invention. For example, in processes requiring a relatively larger scale pattern such that the final elements such as round hemispheres, a relatively large, even a single resin deposition nozzle can comprise the entire jet array. The use of such means would not bring the invention, if practiced therewith, beyond the scope of the appended claims.

What is claimed is:

1. A method for manufacturing a papermaker's or industrial fabric, said method comprising the steps of:
   a) providing a base substrate for the fabric;
   b) depositing polymeric resin material onto said base substrate at discrete locations in a controlled manner so as to control the x, y, z dimensions of said material deposited to create a predetermined pattern in droplets to provide a desired functional property to the fabric; and
   c) at least partially setting said polymeric resin material, wherein the method includes building up at least one x, y, z dimensionally controlled geometric shape with a plurality of the droplets of polymeric resin material, wherein each droplet of the shape is partially set before the deposition of the subsequent droplet when building up the shape.

2. A method as claimed in claim 1 wherein said droplets have an average diameter of 10µ (10 microns) or more.

3. A method as claimed in claim 1 further comprising the optional step of abrading said polymeric resin material deposited on said base substrate to provide said polymeric resin material above the surface plane of said base substrate with a uniform thickness and smoothness.

4. A method as claimed in claim 1 wherein steps b) and c) are performed sequentially on successive bands extending widthwise across said base substrate.

5. A method as claimed in claim 1 wherein steps b) and c) are performed sequentially on successive strips extending lengthwise around said base substrate.

6. A method as claimed in claim 1 wherein steps b) and c) are performed spirally around said base substrate.

7. A method as claimed in claim 1 wherein, in step b), said preselected locations on said base substrate are knuckles formed by lengthwise yarns of said base substrate passing over crosswise yarns.

8. A method as claimed in claim 1 wherein, in step b), said preselected locations on said base substrate are knuckles formed by crosswise yarns of said base substrate passing over lengthwise yarns.

9. A method as claimed in claim 1 wherein, in step b), said preselected locations on said base substrate are interstices between lengthwise and crosswise yarns of said base substrate.

10. A method as claimed in claim 1 wherein, in step b), said polymeric resin material is deposited by a piezojet array comprising a plurality of individual computer controlled piezojets.

11. A method as claimed in claim 1 wherein step b) comprises the steps of:
    i) checking the surface of said base substrate to ensure that said polymeric resin material has been deposited onto said preselected locations; and
    ii) depositing said polymeric resin material onto said preselected locations lacking polymeric resin material.

12. A method as claimed in claim 11 wherein said checking step is performed by a fast pattern recognizer (FPR) processor operating in conjunction with a digital imaging camera.

13. A method as claimed in claim 12 wherein said depositing step is performed by a piezojet array coupled to said FPR processor.

14. A method as claimed in claim 1, wherein said polymeric resin material is:
    hot melts; moisture-cured hot melts;
    two part reactive systems based on urethanes and epoxies;
    photopolymerizable compositions consisting of reactive acrylated monomers and acrylated oligomers derived from urethanes, polyesters, polyethers, and silicones; or
    aqueous-based latexes and dispersions and particle-filled formulations including acrylics and polyurethanes.

15. A method as claimed in claim 1 wherein said curing step is performed by exposing said polymeric resin material to a heat source.

16. A method as claimed in claim 1 wherein said curing step is performed by exposing said polymeric resin material to cold air.

17. A method as claimed in claim 1 wherein said curing step is performed by exposing said polymeric resin material to actinic radiation.

18. A method as claimed in claim 10 wherein said piezojet array comprises a plurality of individual computer controlled piezojets, and wherein some of said individual computer controlled piezojets deposit one polymeric resin material while other individual computer controlled piezojets deposit a different polymeric resin material.

19. A method as claimed in claim 1 wherein the base substrate is selected from the group consisting of woven fabric, nonwoven fabric, spiral formed fabric, spiral-link fabric, knitted fabric, mesh, strips of material which are ultimately wound to form a substrate having a width greater than a width of the strips, and a substrate which includes batt.

20. A method as claimed in claim 1 wherein the method includes building up at least one x, y, z dimensionally controlled geometric shape to be square, round, conical, rectangular, trapezoidal or layered.

* * * * *